United States Patent
Aboud et al.

(10) Patent No.: US 12,530,500 B1
(45) Date of Patent: Jan. 20, 2026

(54) DATA SCRUBBING FOR VERY LARGE DATABASES

(71) Applicant: Wells Fargo Bank, N.A., San Francisco, CA (US)

(72) Inventors: Zackary George Aboud, Santa Barbara, CA (US); Roy Robert Kelly Nuyda, Union City, CA (US); Peter Rozovski, Concord, CA (US); Peter Alan Seymour, Towson, MD (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/775,353

(22) Filed: Jul. 17, 2024

(51) Int. Cl.
  *G06F 16/21*   (2019.01)
  *G06F 16/23*   (2019.01)
  *G06F 21/62*   (2013.01)

(52) U.S. Cl.
  CPC .......... *G06F 21/6254* (2013.01); *G06F 16/21* (2019.01); *G06F 16/2365* (2019.01); *G06F 2221/2143* (2013.01)

(58) Field of Classification Search
  CPC .. G06F 21/6254; G06F 16/21; G06F 16/2365; G06F 2221/2143; G06Q 30/0615
  USPC ........................................................ 707/694
  See application file for complete search history.

(56) References Cited

U.S. PATENT DOCUMENTS

| | | | | |
|---|---|---|---|---|
| 2009/0319588 | A1* | 12/2009 | Gandhi | G06F 16/21 |
| 2019/0332784 | A1* | 10/2019 | Allen | G06F 21/6254 |
| 2019/0354717 | A1* | 11/2019 | Boon | H04L 63/0421 |
| 2021/0004478 | A1* | 1/2021 | Narayanan | G06F 21/6236 |

OTHER PUBLICATIONS

"ROWID Pseudocolumn", [Online]. Retrieved from the Internet: https: docs.oracle.com en database oracle oracle-database 19 sqlrf ROWID-Pseudocolumn.html, (Accessed on Jul. 18, 2024), 1 pg.

\* cited by examiner

*Primary Examiner* — Michael Pham
(74) *Attorney, Agent, or Firm* — SCHWEGMAN LUNDBERG & WOESSNER, P.A.

(57) ABSTRACT

This disclosure relates to a method and system for data scrubbing in very-large-databases (VLDB) within regulated industries. The method involves segmenting a copy of a production database into manageable chunks based on row identifiers, allowing for parallel processing without database contention. Each chunk is processed by concurrently executing instances of a data scrubbing component, which replaces sensitive data with anonymous data of the same type using specified scrubbing algorithms. The system ensures that scrubbed data maintains the same structure and statistical properties as the original data while preventing the restoration of sensitive information. The process is meticulously documented to meet regulatory standards and facilitate audits, making it a robust solution for data scrubbing in environments with stringent compliance requirements.

17 Claims, 5 Drawing Sheets

US 12,530,500 B1

DATA SCRUBBING FOR VERY LARGE DATABASES

TECHNICAL FIELD

Embodiments pertain to data management technologies and, in some examples, to algorithms and systems to implement data scrubbing for very-large-databases (VLDB) in regulated industries.

BACKGROUND

Databases are structured systems for storing, managing, and retrieving information. They are tools in various fields, including business, science, and technology that facilitate efficient data handling and accessibility. Traditionally, databases are categorized based on their structure and the type of data they manage, such as relational databases, which organize data into tables that are interrelated through keys, and non-relational databases, which store data in a more flexible format like key-value pairs, documents, or graphs.

In recent years, the advent of 'very large databases' or 'VLDBs' has been a significant development in the field of data management. These databases handle extraordinarily large volumes of data, often scaling to petabytes or exabytes of information. VLDBs are not only characterized by their size but also by their ability to support high transaction rates and complex query processing across distributed systems. Technologies such as distributed database systems, data warehousing, and online analytical processing (OLAP) are commonly employed to manage and analyze data in VLDBs efficiently.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
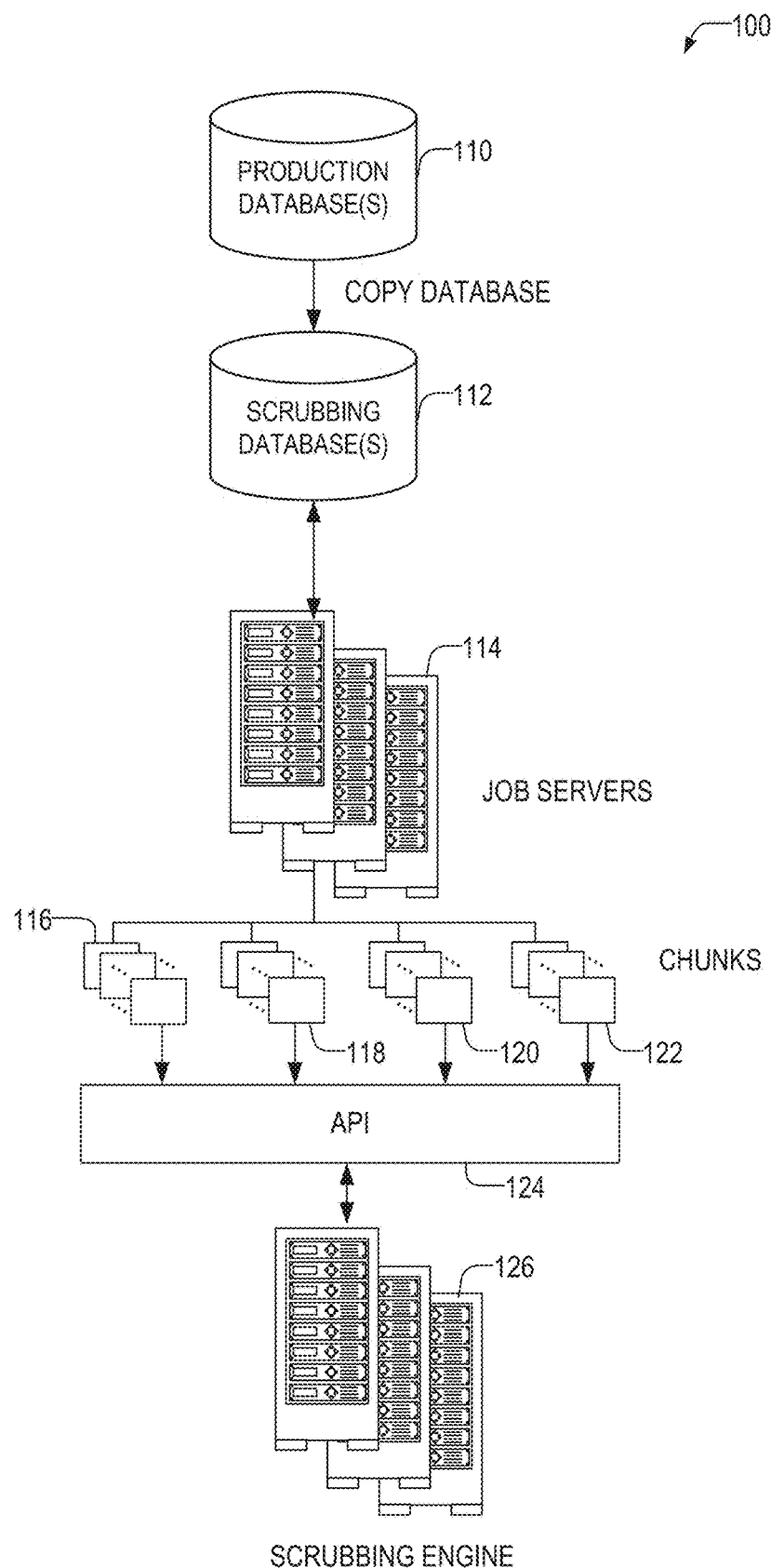
FIG. 1 is a block diagram illustrating a data scrubbing system designed for very large databases (VLDB) in regulated industries, according to some examples.

Databases are integral components of modern software applications, serving as the backbone for data storage, management, and retrieval. These applications rely on databases to perform a myriad of tasks, ranging from simple data logging to complex transaction processing and real-time analytics. The accuracy, efficiency, and reliability of these software applications are heavily dependent on the underlying database's performance and integrity.

Software development of these applications includes testing of developed code in pre-production environments before deploying code to production. In regulated industries like the financial industry and medical industry, production databases cannot be used in pre-production due to the high risk of disclosure of sensitive personal information like financial account numbers or health information. At the same time, for many types of testing, test data needs to be close to production data. Due to the size of these databases, manually creating a test database is not only infeasible, but it would be difficult to ensure that any such artificial database would be close enough to the production formats to ensure proper test case execution. This makes modifying production data by removing sensitive information important before using the data in pre-production.

Modifying data to prevent leakage and disclosure of sensitive information is a complicated process. At the same time, modified data should keep the same diversity of the data as original production data because the diversity of data impacts functional testing, performance, and scalability testing. Keeping data diversity allows testing all cases of business logic the same way as with real production data. Additionally, to keep performance and scalability testing reliable keeping the uniqueness of modified data similar to the uniqueness of original production data, and also keeping the cardinality of all indexed fields in modified data is important.

In systems handling extraordinarily large volumes of data, the problem is even more complex. If a database has 50+TB with hundreds of tables containing confidential information to be modified and several hundreds or even thousands of columns to be modified, making hundreds of billions of changes in a reasonable time is a complex task. In regulated industries like banking, financial, and healthcare industries, the situation is even more complicated. Data modification procedures cannot be just a collection of homemade scripts; they must be implemented in such a way that they can pass government and other audits and show compliance with regulations. In regulated industries, a proper automated modification documentation process may be even more important than the modification process itself.

There is a need for a method and system that can create a test database that closely matches the production environment in terms of data structure and content. This system must also protect sensitive information and generate the database efficiently and accurately for ongoing testing needs. One common approach to solving this problem is through using data masking and scrubbing tools, where sensitive data elements are identified and either masked or removed. Data scrubbing tools, unlike data masking tools, substitute sensitive data with non-sensitive equivalents that maintain the same data type and format and ensure that scrubbed data cannot be restored. The scrubbing process also ensures the changes are consistent across all instances of a sensitive data field in different tables to prevent data integrity issues.

While data scrubbing tools appear to solve the problems described, implementing data scrubbing effectively in very large databases presents significant challenges. Standard data scrubbing tools often struggle with the scale and complexity of these databases, leading to performance bottlenecks and incomplete data scrubbing. The sheer volume of data and the intricate relationships between data tables can overwhelm traditional tools, which are not designed to handle such extensive datasets efficiently.

In response to these limitations, some developers have resorted to creating custom scripts to perform data scrubbing. While these homemade scripts can be tailored to specific database schemas and requirements, these custom scripts often fall short in several critical areas when it comes to data scrubbing for very-large-databases (VLDB) in regulated industries. For example:

1. Compliance and Audit Requirements: Custom scripts are typically developed in-house and may not adhere to the stringent regulatory standards required in industries such as finance, healthcare, and telecommunications. These industries mandate robust mechanisms to prevent the restoration of original data values and to ensure consistent data scrubbing across related tables. Custom scripts may lack the necessary documentation and rigor to demonstrate compliance during audits, making them unsuitable for regulated environments.
2. Consistency Across Tables: In regulated industries, it is crucial that similar columns in different tables, if they have the same values in the original production data, should have the same scrubbed values. Custom scripts may not consistently apply the same scrubbing logic across all instances of a sensitive data field in different tables, leading to inconsistencies and potential data integrity issues.
3. Scalability and Performance: VLDBs often contain petabytes or exabytes of data, with hundreds of tables and thousands of columns to be scrubbed. Custom scripts may not be optimized to handle such large volumes of data efficiently. They can suffer from performance bottlenecks, leading to prolonged processing times and potential system crashes. The complexity of managing and executing these scripts in parallel to avoid database contention further complicates their use.
4. Robustness and Reliability: Custom scripts may not be as thoroughly tested and validated as commercial software solutions. This can result in vulnerabilities and errors that compromise the effectiveness of the data scrubbing process. In regulated industries, where data integrity and security are paramount, the lack of robustness in custom scripts can lead to significant risks.
5. Documentation and Maintenance: Proper documentation is essential for demonstrating compliance and for the ongoing maintenance and updating of data scrubbing processes. Custom scripts often lack comprehensive documentation, making it difficult to track changes, understand the logic, and ensure that the scripts remain up-to-date with evolving regulatory requirements. This can pose challenges during audits and when modifications are needed.
6. Integration with Industry-Approved Tools: Regulated industries often require the use of industry-approved tools to ensure compliance with standards and regulations. Custom scripts may not integrate seamlessly with these tools, limiting their effectiveness and making it difficult to leverage the benefits of established, validated software solutions.

In summary, while custom scripts can offer performance advantages, their limitations in terms of compliance, consistency, scalability, robustness, documentation, and integration make them unsuitable for data scrubbing in VLDBs within regulated industries. A more comprehensive solution is needed to address these challenges effectively. Therefore, there is a critical need for an advanced data scrubbing solution that can handle the scale of very large databases, ensure compliance with industry regulations, and provide a reliable, consistent method for data scrubbing that prevents the restoration of original data and maintains data integrity across multiple database tables.

The present disclosure relates to a method and system for data scrubbing of very-large-databases (VLDB) in a manner that meets the needs of highly regulated industries. The disclosed approach segments database tables into manageable chunks (e.g., that may be defined by row identifier (ROWID) ranges) that allow for parallel scrubbing of multiple chunks while avoiding disk contention. This method combines the flexibility and performance benefits of custom scripts with the compliance and audit capabilities of industry-approved data scrubbing engines (e.g., such as Delphix). The system ensures that scrubbed data maintains the same diversity, structure, and statistical properties as the original production data, while preventing the restoration of sensitive information. Additionally, the process may be meticulously documented to meet regulatory standards and facilitate audits, making it a robust solution for data scrubbing in environments with stringent compliance requirements.

Given the structure of the VLDB system, the selection of how to segment the VLDB into chunks, and the selection of which chunks are processed concurrently may affect the efficiency of the parallel processing. For example, if two database chunks that are stored on a same disk are processed in parallel, the system may suffer from high latency while the contention for that disk is resolved. Thus, a way of segmenting the VLDB that avoids disk contention is desired.

VLDB systems comprise a plurality of tablespaces, which are logical storage units containing one or more data files. The data files are physical files that store the database data in operating system blocks on disk storage devices. Within each tablespace, the database data is organized into segments, which are sets of extents that store data for specific database objects like tables or indexes. The segments are further divided into data blocks, which are the smallest units of data storage, typically sized at 4 KB or 8 KB.

Each row in a database table is uniquely identified by a row identifier (rowid) that represents the physical address or location where that row is stored. The rowid encodes the object number identifying the table, the relative file number for the data file, the block number within that file, and the row number position within the block where the row is located. The rowid is a pseudo-column that is not stored directly with the table data but is constructed from metadata in the data files when a row is accessed. This allows quickly locating and retrieving rows based on their physical addresses, providing a fast access method used extensively by the database system for indexing, enforcing constraints, joining data, and other internal operations.

As noted, in some examples the VLDB may be segmented based upon their ROWID. That is, each segment may include one or more ROWIDs that are stored inside same table area. The ROWID may be utilized to determine a database blocks path where the actual data is stored and the VLDB may be segmented such that data within a same table area is put into a same chunk, or if put in different chunks, to ensure that these chunks can be processed concurrently at the same time without database contention. Records of tables are stored inside the database blocks. If two chunks have records from the same database block, then parallel processing of such two chunks results in conflict, which is called database contention. Chunks from different table areas may then be assigned to different data scrubbing instances to allow for parallel processing without contention or with minimal contention.

In some examples, the database tables and their respective columns that contain sensitive information are analyzed and catalogued. This catalog serves as a blueprint for the data scrubbing operations by serving as a guide to identify each column that is to be scrubbed. As noted, the database tables are then segmented into chunks, e.g., based upon row-id. For each chunk, a script may be executed that determines, based upon the catalogue, which data within the range needs to be scrubbed and which algorithm is used to scrub the data. In some examples, the algorithms that are selected for scrubbing each column may be automatically identified and determined based upon one or more rules that factor in the data stored, the type of data stored, and so on. The script then instantiates an instance of a scrubbing engine, passing the scrubbing engine chunk details (table name, column names, from which row id to which row id to scrub, the primary key), and column details (which column to scrub with which algorithm). The scrubbing engine instance may then execute the scrubbing in parallel with another scrubbing engine instance scrubbing different chunks.

In some examples, the scrubbing operation works on the database in-place. That is, scrubbed fields are written by the scrubbing instance back to the database. In other examples, a copy of each chunk is scrubbed and then sent back to the script. In these examples, once each chunk is processed the scrubbed chunks are then recombined to form a scrubbed database which may be used for testing. The scrubbing process is designed to ensure that while sensitive data is altered to prevent disclosure, the overall structure, length, and statistical properties of the data remain unchanged. This is particularly important for performance, scalability, and functional testing, where the realism of the test data can significantly influence the outcome.

FIG. 1 shows a data scrubbing system 100 designed for very large databases (VLDB) in regulated industries. The system includes a production database 110, which contains the sensitive data that needs to be scrubbed. A copy of this database is created and stored in a scrubbing database 112. The scrubbing database 112 serves as the working database on which the data scrubbing operations are performed.

Job servers 114 access the scrubbing database 112 and are responsible for managing and executing the data scrubbing tasks. The job servers 114 divide the scrubbing database 112 into chunks 116, 118. Each chunk represents a segment of the database, e.g., which may be defined by a range of one or more row identifiers (ROWIDs). This chunking approach allows for parallel processing of the data, reducing the risk of database contention and improving the efficiency of the scrubbing process.

The chunks 116, 118, 120, and 122 are identified by the job servers 114 and information about them, or a copy of those chunks is then sent to the scrubbing engine 126 via the Application Programming Interface (API) 124. The job servers 114 also pass along information on which columns to scrub and which scrubbing algorithms to use. The API 124 facilitates communication between the job servers 114 and a scrubbing engine 126. The scrubbing engine 126 applies the specified scrubbing algorithms to the specified columns in the data chunks, ensuring that sensitive information is replaced with non-sensitive equivalents while maintaining the data's structure and statistical properties. The chunks are then either scrubbed in place (e.g., by the scrubbing engine making changes directly within the database) or a copy of the chunk is scrubbed and then sent back to the job servers 114 which then re-combine the data within the scrubbing database 112.

The system 100 ensures that the scrubbing process is compliant with audit requirements by documenting each step of the process. This documentation includes details about the chunks processed, the algorithms applied, and the results of the scrubbing operations. In some examples, the job servers execute one or more scripts. The use of parallel processing and industry-approved software, such as the scrubbing engine 126, provides a robust solution for data scrubbing in VLDBs within regulated industries.

Figure 2:
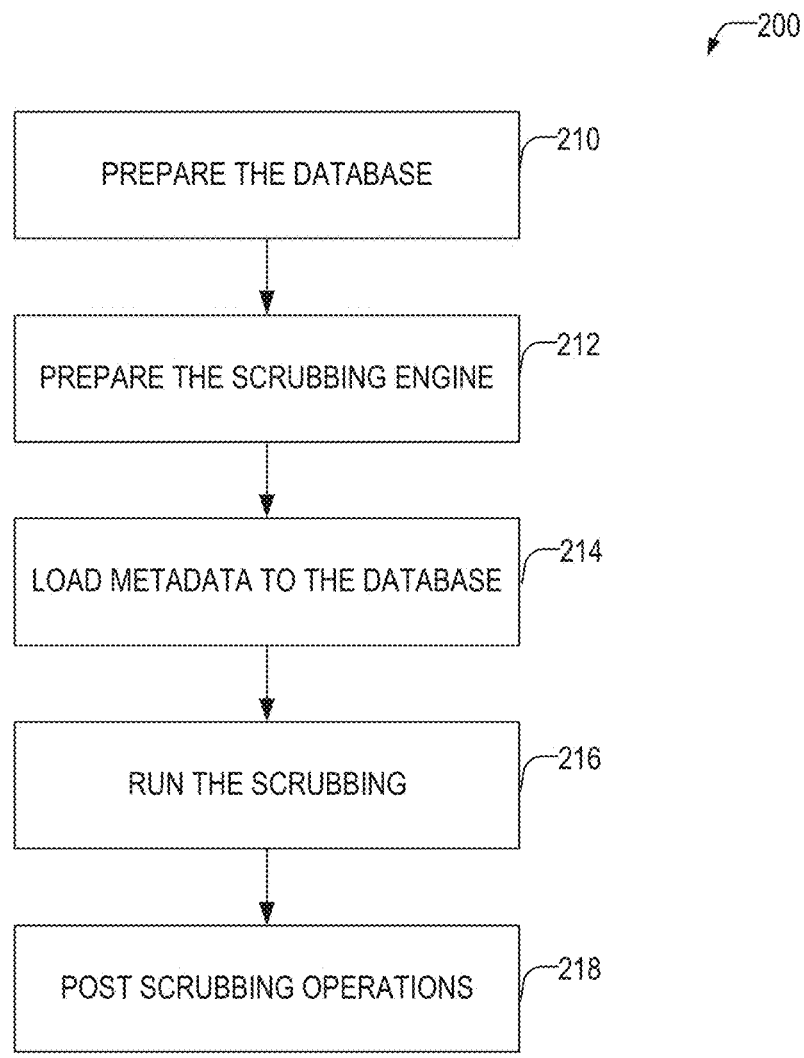
FIG. 2 is a flowchart illustrating a method of scrubbing a copy of a production database, according to some examples.

FIG. 2 shows a method 200 of scrubbing a copy of a production database. The method 200 includes several steps to ensure the scrubbing process is efficient and compliant with audit requirements. The first step is to prepare the database at operation 210. This involves creating necessary database objects such as a copy of the production database, and in some examples, additional tables and indexes. In some examples, additional database tables (e.g., in the scrubbing database) are created that identify a list of columns in the database tables to scrub along with algorithm identifiers. Another table may include a list of chunk IDs arranged based on the row ID. In some examples, the chunks may only include sections of the database that has data that is to be scrubbed. In other examples, the entire database may be separated into chunks.

In some examples, certain objects, indexes, constraints, and triggers are also disabled on the database during the preparation step. Objects may include various database components such as views, stored procedures, or user-defined functions that are disabled to avoid conflicts during the scrubbing process. Indexes may be used to speed up the retrieval of data and some indexes may be disabled during scrubbing to prevent performance issues or conflicts. Constraints enforce rules on the data, such as primary keys, foreign keys, and unique constraints. These may be disabled to allow the scrubbing process to modify data without violating these rules. Triggers are automated actions that occur in response to certain events on a table, such as insertions, updates, or deletions. They may be disabled to prevent unintended actions during the scrubbing process.

The second step is to prepare the scrubbing engine at operation 212. In some examples, the scrubbing engine may be a Delphix scrubbing engine. In some examples preparing the scrubbing engine at operation 212 includes specifying which columns to scrub and which algorithms are applied to which columns. For example, by pointing the scrubbing engine, or otherwise providing the scrubbing engine with the database tables prepared in operation 210. The scrubbing algorithms may be provided by the job server or may be selected from a prespecified list of algorithms provided by the scrubbing engine. In some examples, this step also configures jobs by assigning a specified number of jobs to a table, allowing for concurrent processing of chunks. Proper authorization and environment details are provided, and metadata is pulled using an API. Job information may also be pulled from the scrubbing engine and recorded in the database.

The third step is to load metadata to the database at operation 214. This involves pulling scrubbing engine metadata to sync with the database. The metadata includes details about the columns to be scrubbed, the algorithms to be used, and the chunk IDs. This step ensures that the database has all the necessary information to perform the scrubbing process accurately.

The fourth step is to run the scrubbing at operation 216. Once the metadata is loaded, the scrubbing process begins. The scrubbing engine processes each chunk by calling the API with the chunk details, including the table name, column names, row ID range, primary identifier, and the algorithm to be used. The scrubbing engine executes the scrubbing in parallel with other instances, ensuring efficient processing without database contention.

The final step is post-scrubbing operations at operation 218. In some examples, this may involve enabling certain objects, indexes, constraints, and triggers that were previously disabled. The system ensures that the scrubbing process is compliant with audit requirements by documenting each step, including the chunks processed, the algorithms applied, and the results of the scrubbing operations. This documentation facilitates audits and ensures compliance with regulatory standards.

Figure 3:
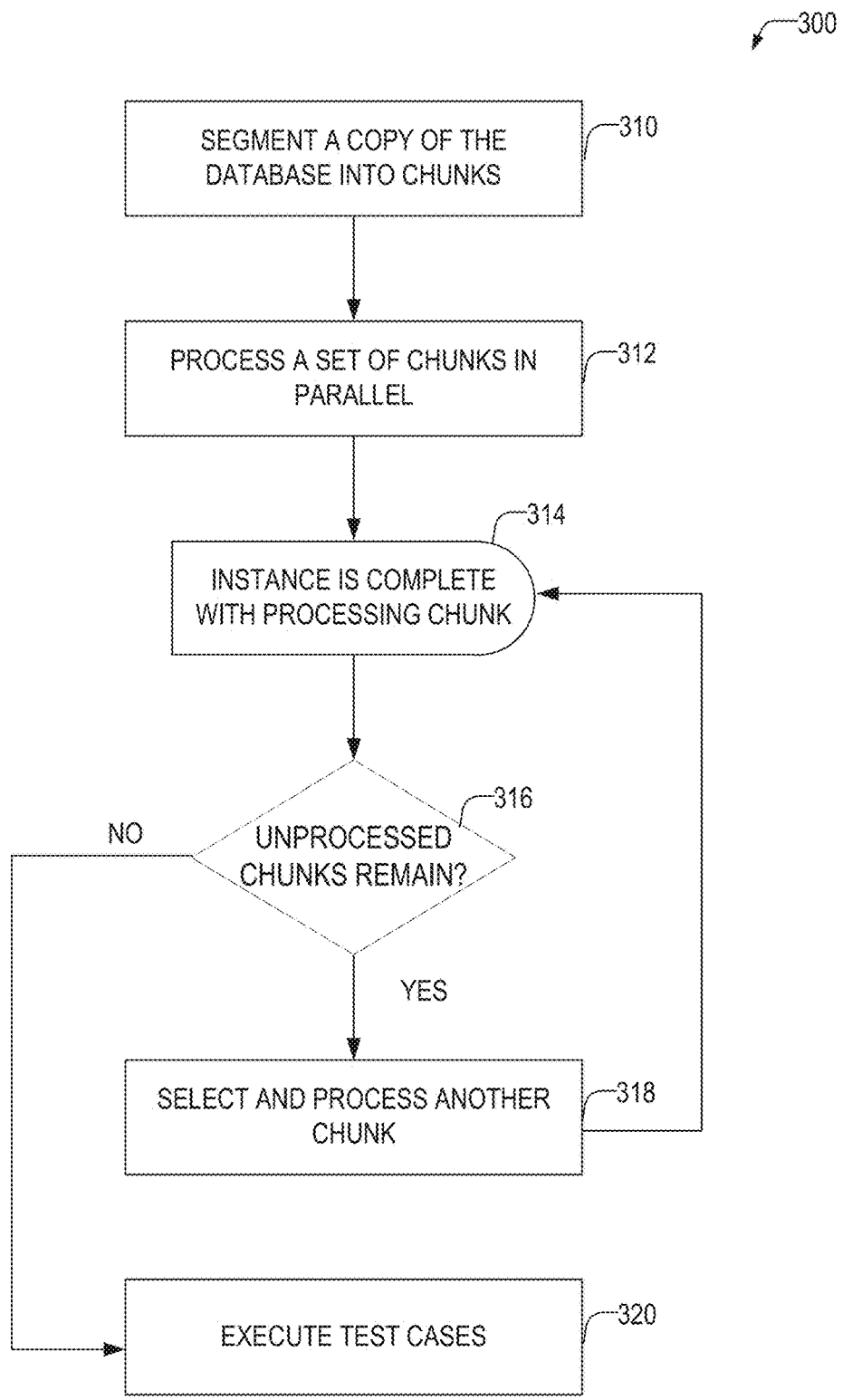
FIG. 3 is a flowchart illustrating a method of scrubbing a VLDB, according to some examples.

FIG. 3 shows a method 300 of scrubbing a VLDB according to some examples of the present disclosure. The first step is to segment a copy of the database into chunks at operation 310. This involves dividing the database into manageable segments, e.g., based on row identifiers. In some examples, the size of segment may be based upon a maximum segment size of the scrubbing engine. Segmenting the database into chunks allows for parallel processing, which reduces the risk of database contention and improves the efficiency of the scrubbing process.

The second step is to process a set of chunks in parallel at operation 312. Each chunk is processed by passing the chunk, or information about the chunk, along with identifiers of sensitive data and scrubbing algorithms, to multiple concurrently executing instances of a data scrubbing component. This parallel processing ensures that the scrubbing operations are performed efficiently and without database contention. A record of the chunk is then marked as having an in-progress status with an execution identifier provided by the scrubbing engine that identifies the instance executing the scrubbing operation on that chunk. In some examples, the system authenticates using secure authentication credentials prior to initiating the scrubbing process to login and logs out of the data scrubbing component after completion.

In some examples, the data scrubbing engine may provide a completion message back to the job servers. The completion message may identify the execution identifier. The job servers may then find the chunk having that associated execution identifier and mark the chunk as scrubbed. In other examples, the system may need to periodically query the job statuses of chunks marked as being currently scrubbed (e.g., using the execution id provided by the data scrubbing engine upon starting the job) with the scrubbing engine. If the status is returned as "complete" the job servers may mark the chunk as scrubbed.

Once an instance completes processing a chunk at operation 314, the method checks if unprocessed chunks remain at operation 316. For example, by searching for chunk records that have a status of incomplete. If unprocessed chunks remain, the method proceeds to select and process another chunk at operation 318. This involves assigning another chunk to the data scrubbing component for processing. In some examples, a next available chunk may be assigned. In other examples, the system may select a next available chunk that is not stored on a same disk as one or more chunks that are being presently processed by an instance of the data scrubber. A selected chunk is then assigned to the available instance of the data scrubbing engine in the same way as described with reference to operation 312 with the execution identifier being stored in association with the chunk.

In some examples, timers may be used to verify that the instance of the data scrubber did not take too long to complete the chunk. For example, the data scrubber may have had an internal error and may be stuck in an infinite loop. In other examples, the data scrubber instance may return an error. In these examples, the chunk may be retried one or more times. If the retry operations fail, the system may provide an error.

If no unprocessed chunks remain, the method proceeds to execute test cases at operation 320. The scrubbed database is used to run one or more test cases, ensuring that the test data closely replicates the production environment while protecting sensitive information. This step validates the functionality, performance, and scalability of the software application being tested.

Figure 4:
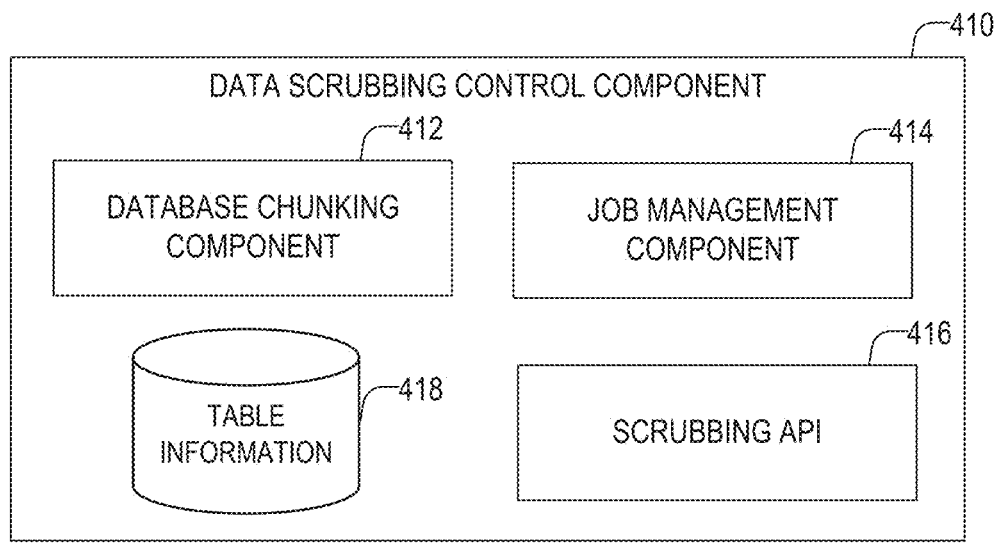
FIG. 4 is a logical diagram illustrating a data scrubbing control component, according to some examples.

FIG. 4 shows a logical diagram of a data scrubbing control component 410 according to some examples of the present disclosure. In some examples, the data scrubbing control component 410 may be run on the job servers 114 of FIG. 1. The data scrubbing control component 410 includes a database chunking component 412. The database chunking component 412 is responsible for segmenting the database into manageable chunks based on row identifiers. This segmentation allows for parallel processing of the data, reducing the risk of database contention and improving the efficiency of the scrubbing process.

The data scrubbing control component 410 also includes a job management component 414. The job management component 414 manages and coordinates the execution of scrubbing tasks. The job management component 414 assigns chunks to different instances of the scrubbing engine and ensures that the scrubbing operations are performed efficiently and without database contention. In some examples the job management component 414 monitors job status and assigns new chunks when jobs complete. Job management component 414 also notifies the user and/or automatically executes one or more test cases (e.g., from a test case library) upon completion of all jobs.

A scrubbing API 416 is part of the data scrubbing control component 410. The scrubbing API 416 facilitates communication between the job management component 414 and the scrubbing engine. The scrubbing API 416 allows the job management component 414 to send chunk details, including table names, column names, row ID ranges, primary identifiers, and the algorithms to be used, to the scrubbing engine for processing.

The data scrubbing control component 410 further includes table information 418. The table information 418 stores metadata about the database tables, including details about the columns to be scrubbed and the algorithms to be used. This information is used by the database chunking component 412 and the job management component 414 to ensure that the scrubbing process is accurate and compliant with audit requirements.

The data scrubbing engine is a specialized software component designed to execute the data scrubbing process efficiently and in compliance with regulatory standards. It receives detailed instructions from custom scripts, including chunk details such as table names, column names, row identifier (ROWID) ranges, primary keys, and the specific scrubbing algorithms to be applied. The engine processes each chunk of data by applying the designated scrubbing algorithms, ensuring that sensitive information is replaced with non-sensitive equivalents. This process is carried out in parallel across multiple chunks, leveraging the engine's capability to handle concurrent tasks without causing database contention.

In addition to executing the scrubbing tasks, the data scrubbing engine plays a crucial role in maintaining the integrity and consistency of the scrubbed data. It ensures that the modified data retains the same diversity, structure, and statistical properties as the original production data, which is essential for reliable testing in pre-production environments. The engine also prevents the restoration of sensitive information, thereby safeguarding against data breaches. Furthermore, the engine meticulously documents each step of the scrubbing process, including the chunks processed, the algorithms applied, and the results obtained. This comprehensive documentation is vital for passing audits and demonstrating compliance with regulatory requirements, making the data scrubbing engine an indispensable tool in regulated industries.

As used herein, chunks refer to segments or "slices" of database tables. In some examples, the chunks may be defined by a range of row identifiers (ROWIDs). This segmentation allows for parallel processing of multiple updates to the same table or partition without causing database contention, thereby managing the volume per update efficiently. As used herein data scrubbing refers to the process of modifying data to ensure that sensitive or confidential information is replaced with non-sensitive equivalents. This process is designed to prevent the leakage and disclosure of sensitive information while maintaining the data's diversity, structure, and statistical properties. The scrubbing process involves identifying sensitive data elements to modify the data, applying appropriate algorithms to anonymize or scrub the data, and ensuring that the modified data cannot be restored to its original form.

In some examples, certain database vendors, such as Oracle, include a built-in chunking functionality for non-partitioned tables. For non-partitioned tables, the present system may utilize the built-in chunking capabilities, which efficiently divide the tables into manageable segments based on row identifiers (ROWIDs). This built-in chunking method leverages the database vendor's native functionalities to ensure optimal performance and minimal database contention. However, for partitioned tables, the system may employ a custom chunking procedure. This custom approach is necessary because built-in chunking does not support chunking within partitions. The custom chunking procedure ensures that each partition is divided into chunks that can be processed in parallel, thereby maintaining the efficiency and scalability of the data scrubbing process.

In some examples, the data scrubbing control component may be or include one or more custom scripts that are used to make API calls to the data scrubbing engine, providing details such as table names, column names, ROWID ranges, primary keys, and the specific scrubbing algorithms to be applied. The API facilitates seamless communication between the custom scripts and the scrubbing engine, ensuring that the scrubbing process adheres to regulatory standards and prevents the restoration of sensitive information. Additionally, the system may utilize special tables to specify columns to scrub and algorithm identifiers. These tables include a list of columns in each table that need to be scrubbed and the corresponding algorithms to be used. Another table contains a list of chunk IDs and arranges the chunks based on the ROWID. This metadata is used for accurately configuring the scrubbing process and ensuring compliance with audit requirements.

The process of configuring jobs and querying the data scrubbing engine for execution status includes, in some examples, a preparation phase where jobs are configured by specifying which columns to scrub and which algorithms to apply. The jobs are then assigned to specific chunks, allowing for concurrent processing of multiple chunks. Proper authorization and environment details are provided to ensure secure access to the scrubbing engine. Metadata is pulled using a special API, and job information is retrieved from the scrubbing engine and recorded in the database. Once a scrubbing job is submitted to the engine, an execution ID is received, marking the chunk as being processed. The system queries the scrubbing engine for the status of the execution, enabling monitoring and management of the scrubbing process. This comprehensive approach ensures that the data scrubbing process is efficient, compliant with regulatory standards, and thoroughly documented for audit purposes.

Figure 5:
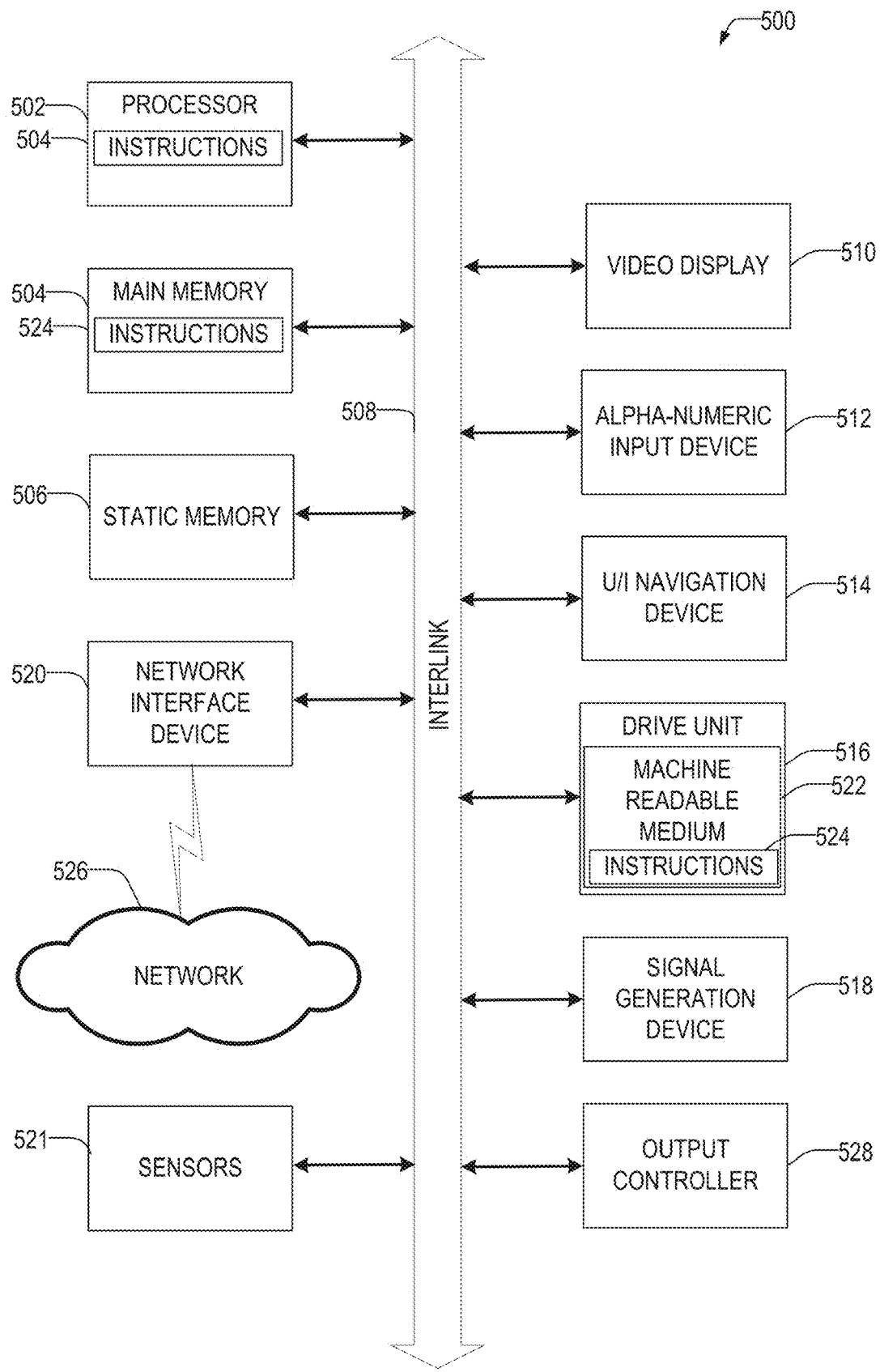
FIG. 5 is a block diagram illustrating an example machine upon which one or more techniques discussed herein may be performed, according to some examples.

FIG. 5 illustrates a block diagram of an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be in the form of a server computer, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 500 may be or be configured to implement one or more database servers, store one or more databases, job servers, API servers, scrubbing engines, or the like. Machine 500 may be configured to perform the methods 200, 300, and contain the data scrubbing control component 410 and subcomponents shown in FIG. 4.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 500 may include one or more hardware processors, such as processor 502. Processor 502 may be a central processing unit (CPU), a graphics processing unit (GPU), a hardware processor core, or any combination thereof. Machine 500 may include a main memory 504 and a static memory 506, some or all of which may communicate with each other via an interlink (e.g., bus) 508. Examples of main memory 504 may include Synchronous Dynamic Random-Access Memory (SDRAM), such as Double Data Rate memory, such as DDR4 or DDR5. Interlink 508 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520. The Machine 500 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

Other Notes and Examples

Example 1 is a method for testing software that utilizes a database, the method comprising: using one or more computer processors: segmenting a copy of a production database storing data into a plurality of chunks based upon row identifiers; processing a subset of the plurality of chunks in parallel by passing each particular chunk of the subset, identifiers of sensitive columns in each particular chunk, and identifiers of scrubbing algorithms to use for each sensitive column in each particular chunk to a different one of a plurality of concurrently executing instances of a data scrubbing component, wherein the data scrubbing component replaces identified fields in the copy of the production database of sensitive columns of each particular chunk of the database with anonymous data of a same type based upon scrubbing algorithms identified by the identifiers; receiving an indication that one of the plurality of concurrently executing instances of the data scrubbing component has completed scrubbing of an assigned chunk; responsive to receiving the indication that the one of the plurality of concurrently executing instances of the data scrubbing component has completed scrubbing of the assigned chunk, assigning another of the plurality of chunks not in the subset to the one of the plurality of concurrently executing instances of the data scrubbing component; determining that all of the plurality of chunks of the production database have been scrubbed; and once all of the plurality of chunks have been scrubbed, executing one or more software test cases on the copy of the production database.

In Example 2, the subject matter of Example 1 includes, wherein segmenting the production database with customer data into the plurality of chunks based upon row identifiers comprises segmenting the production database such that no two chunks are stored on a same disk.

In Example 3, the subject matter of Examples 1-2 includes, wherein processing each particular one of the plurality of chunks in parallel component comprises: instantiating each of the plurality of concurrently executing instances; and assigning chunks belonging to different disks to the plurality of concurrently executing instances of the data scrubbing component to prevent disk contention.

In Example 4, the subject matter of Examples 1-3 includes, wherein segmenting the production database with customer data into the plurality of chunks based upon row identifiers comprises assigning rows within a same datablock.

In Example 5, the subject matter of Examples 1-4 includes, logging each scrubbing operation performed on the chunks, including a chunk identifier, a scrubbing algorithm used, and a status of the scrubbing operation, to create an audit trail for compliance verification.

In Example 6, the subject matter of Examples 1-5 includes, logging a job identifier for each of the plurality of concurrently executing instances; sending a request to one of the plurality of concurrently executing data scrubber components for a job status using a previously stored job identifier; and wherein the receiving an indication that one of the plurality of concurrently executing instances of the data scrubbing component has completed scrubbing of its assigned chunk is responsive to sending the request.

In Example 7, the subject matter of Examples 1-6 includes, logging into the data scrubbing component using authentication credentials before initiating the processing the subset; and logging out of the data scrubbing component upon completion of a scrubbing process to ensure secure access and prevent unauthorized use.

Example 8 is a computing device for testing software that utilizes a database, the computing device comprising: a hardware processor; a memory, the memory storing instructions, which when executed by the hardware processor cause the computing device to perform operations comprising: segmenting a copy of a production database storing data into a plurality of chunks based upon row identifiers; processing a subset of the plurality of chunks in parallel by passing each particular chunk of the subset, identifiers of sensitive columns in each particular chunk, and identifiers of scrubbing algorithms to use for each sensitive column in each particular chunk to a different one of a plurality of concurrently executing instances of a data scrubbing component, wherein the data scrubbing component replaces identified fields in the copy of the production database of sensitive columns of each particular chunk of the database with anonymous data of a same type based upon scrubbing algorithms identified by the identifiers; receiving an indication that one of the plurality of concurrently executing instances of the data scrubbing component has completed scrubbing of an assigned chunk; responsive to receiving the indication that the one of the plurality of concurrently executing instances of the data scrubbing component has completed scrubbing of the assigned chunk, assigning another of the plurality of chunks not in the subset to the one of the plurality of concurrently executing instances of the data scrubbing component; determining that all of the plurality of chunks of the production database have been scrubbed; and once all of the plurality of chunks have been scrubbed, executing one or more software test cases on the copy of the production database.

In Example 9, the subject matter of Example 8 includes, wherein the operations further comprise segmenting the production database with customer data into the plurality of chunks based upon row identifiers such that no two chunks are stored on a same disk.

In Example 10, the subject matter of Examples 8-9 includes, wherein the operation of processing each particular one of the plurality of chunks in parallel comprises: instantiating each of the plurality of concurrently executing instances; and assigning chunks belonging to different disks to the plurality of concurrently executing instances of the data scrubbing component to prevent disk contention.

In Example 11, the subject matter of Examples 8-10 includes, wherein the operation of segmenting the production database with customer data into the plurality of chunks based upon row identifiers comprises assigning rows within a same datablock.

In Example 12, the subject matter of Examples 8-11 includes, wherein the operations further comprise: logging each scrubbing operation performed on the chunks, including a chunk identifier, a scrubbing algorithm used, and a status of the scrubbing operation, to create an audit trail for compliance verification.

In Example 13, the subject matter of Examples 8-12 includes, wherein the operations further comprise: logging a job identifier for each of the plurality of concurrently executing instances; sending a request to one of the plurality of concurrently executing data scrubber components for a job status using a previously stored job identifier; and wherein the receiving an indication that one of the plurality of concurrently executing instances of the data scrubbing component has completed scrubbing of its assigned chunk is responsive to sending the request.

In Example 14, the subject matter of Examples 8-13 includes, wherein the operations further comprise: logging into the data scrubbing component using authentication credentials before initiating the processing the subset; and logging out of the data scrubbing component upon completion of a scrubbing process to ensure secure access and prevent unauthorized use.

Example 15 is a machine-readable medium, storing instructions for testing software that utilizes a database, the instructions, which when executed by a machine, cause the machine to perform operations comprising: segmenting a copy of a production database storing data into a plurality of chunks based upon row identifiers; processing a subset of the plurality of chunks in parallel by passing each particular chunk of the subset, identifiers of sensitive columns in each particular chunk, and identifiers of scrubbing algorithms to use for each sensitive column in each particular chunk to a different one of a plurality of concurrently executing instances of a data scrubbing component, wherein the data scrubbing component replaces identified fields in the copy of the production database of sensitive columns of each particular chunk of the database with anonymous data of a same type based upon scrubbing algorithms identified by the identifiers; receiving an indication that one of the plurality of concurrently executing instances of the data scrubbing component has completed scrubbing of an assigned chunk; responsive to receiving the indication that the one of the plurality of concurrently executing instances of the data scrubbing component has completed scrubbing of the assigned chunk, assigning another of the plurality of chunks not in the subset to the one of the plurality of concurrently executing instances of the data scrubbing component; determining that all of the plurality of chunks of the production database have been scrubbed; and once all of the plurality of chunks have been scrubbed, executing one or more software test cases on the copy of the production database.

In Example 16, the subject matter of Example 15 includes, wherein the operations further comprise segmenting the production database with customer data into the plurality of chunks based upon row identifiers such that no two chunks are stored on a same disk.

In Example 17, the subject matter of Examples 15-16 includes, wherein the operation of processing each particular one of the plurality of chunks in parallel comprises: instantiating each of the plurality of concurrently executing instances; and assigning chunks belonging to different disks to the plurality of concurrently executing instances of the data scrubbing component to prevent disk contention.

In Example 18, the subject matter of Examples 15-17 includes, wherein the operation of segmenting the production database with customer data into the plurality of chunks based upon row identifiers comprises assigning rows within a same datablock.

In Example 19, the subject matter of Examples 15-18 includes, wherein the operations further comprise: logging each scrubbing operation performed on the chunks, including a chunk identifier, a scrubbing algorithm used, and a status of the scrubbing operation, to create an audit trail for compliance verification.

In Example 20, the subject matter of Examples 15-19 includes, wherein the operations further comprise: logging a job identifier for each of the plurality of concurrently executing instances; sending a request to one of the plurality of concurrently executing data scrubber components for a job status using a previously stored job identifier; and wherein the receiving an indication that one of the plurality of concurrently executing instances of the data scrubbing component has completed scrubbing of its assigned chunk is responsive to sending the request.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A method for testing software that utilizes a database, the method comprising:
using one or more computer processors:
segmenting a copy of a production database storing data into a plurality of chunks based upon row identifiers;
processing a subset of the plurality of chunks in parallel by passing each particular chunk of the subset, identifiers of sensitive columns in each particular chunk, and identifiers of scrubbing algorithms to use for each sensitive column in each particular chunk to a different one of a plurality of concurrently executing instances of a data scrubbing component, wherein the data scrubbing component replaces identified fields in the copy of the production database of sensitive columns of each particular chunk of the database with anonymous data of a same type based upon scrubbing algorithms identified by the identifiers, wherein the processing comprises instantiating each of the plurality of concurrently executing instances and wherein the subset is chosen such that each particular chunk of the subset belongs to different disks to prevent disk contention;
receiving an indication that one of the plurality of concurrently executing instances of the data scrubbing component has completed scrubbing of an assigned chunk;
responsive to receiving the indication that the one of the plurality of concurrently executing instances of the data scrubbing component has completed scrubbing of the assigned chunk, assigning another of the plurality of chunks not in the subset to the one of the plurality of concurrently executing instances of the data scrubbing component;
determining that all of the plurality of chunks of the production database have been scrubbed; and
once all of the plurality of chunks have been scrubbed, executing one or more software test cases on the copy of the production database.

2. The method of claim 1, wherein segmenting a copy of the production database into the plurality of chunks based upon row identifiers comprises segmenting the production database such that no two chunks are stored on a same disk.

3. The method of claim 1, wherein segmenting the copy of the production database storing data into the plurality of chunks based upon row identifiers comprises assigning rows within a same datablock.

4. The method of claim 1, further comprising:
logging each scrubbing operation performed on the plurality of chunks, including a chunk identifier, a scrubbing algorithm used, and a status of the scrubbing operation, to create an audit trail for compliance verification.

5. The method of claim 1, further comprising:
logging a job identifier for each of the plurality of concurrently executing instances;
sending a request to one of the plurality of concurrently executing instances of the data scrubber component for a job status using a previously stored job identifier; and
wherein the receiving an indication that one of the plurality of concurrently executing instances of the data scrubbing component has completed scrubbing of its assigned chunk is responsive to sending the request.

6. The method of claim 1, further comprising:
logging into one of the plurality of concurrently executing instances of the data scrubbing component using authentication credentials before initiating the processing the subset; and
logging out of the one of the plurality of concurrently executing instances of the data scrubbing component upon completion of a scrubbing process to ensure secure access and prevent unauthorized use.

7. A computing device for testing software that utilizes a database, the computing device comprising:
a hardware processor;
a memory, the memory storing instructions, which when executed by the hardware processor cause the computing device to perform operations comprising:
segmenting a copy of a production database storing data into a plurality of chunks based upon row identifiers;
processing a subset of the plurality of chunks in parallel by passing each particular chunk of the subset, identifiers of sensitive columns in each particular chunk, and identifiers of scrubbing algorithms to use for each sensitive column in each particular chunk to a different one of a plurality of concurrently executing instances of a data scrubbing component, wherein the data scrubbing component replaces identified fields in the copy of the production database of sensitive columns of each particular chunk of the database with anonymous data of a same type based upon scrubbing algorithms identified by the identifiers, wherein the processing comprises instantiating each of the plurality of concurrently executing instances and wherein the subset is chosen such that each particular chunk of the subset belongs to different disks to prevent disk contention;

receiving an indication that one of the plurality of concurrently executing instances of the data scrubbing component has completed scrubbing of an assigned chunk;

responsive to receiving the indication that the one of the plurality of concurrently executing instances of the data scrubbing component has completed scrubbing of the assigned chunk, assigning another of the plurality of chunks not in the subset to the one of the plurality of concurrently executing instances of the data scrubbing component;

determining that all of the plurality of chunks of the production database have been scrubbed; and once all of the plurality of chunks have been scrubbed, executing one or more software test cases on the copy of the production database.

8. The computing device of claim 7, wherein the operations of segmenting the copy of the production database into the plurality of chunks based upon row identifiers comprises segmenting the production database such that no two chunks are stored on a same disk.

9. The computing device of claim 7, wherein the operation of segmenting the copy of the production database storing customer data into the plurality of chunks based upon row identifiers comprises assigning rows within a same datablock.

10. The computing device of claim 7, wherein the operations further comprise:
logging each scrubbing operation performed on the plurality of chunks, including a chunk identifier, a scrubbing algorithm used, and a status of the scrubbing operation, to create an audit trail for compliance verification.

11. The computing device of claim 7, wherein the operations further comprise:
logging a job identifier for each of the plurality of concurrently executing instances;
sending a request to one of the plurality of concurrently executing instances of the data scrubber component for a job status using a previously stored job identifier; and
wherein the receiving an indication that one of the plurality of concurrently executing instances of the data scrubbing component has completed scrubbing of its assigned chunk is responsive to sending the request.

12. The computing device of claim 7, wherein the operations further comprise:
logging into one of the plurality of concurrently executing instances of the data scrubbing component using authentication credentials before initiating the processing the subset; and
logging out of the one of the plurality of concurrently executing instances of the data scrubbing component upon completion of a scrubbing process to ensure secure access and prevent unauthorized use.

13. A non-transitory machine-readable medium, storing instructions for testing software that utilizes a database, the instructions, which when executed by a machine, cause the machine to perform operations comprising:

segmenting a copy of a production database storing data into a plurality of chunks based upon row identifiers;

processing a subset of the plurality of chunks in parallel by passing each particular chunk of the subset, identifiers of sensitive columns in each particular chunk, and identifiers of scrubbing algorithms to use for each sensitive column in each particular chunk to a different one of a plurality of concurrently executing instances of a data scrubbing component, wherein the data scrubbing component replaces identified fields in the copy of the production database of sensitive columns of each particular chunk of the database with anonymous data of a same type based upon scrubbing algorithms identified by the identifiers, wherein the processing comprises instantiating each of the plurality of concurrently executing instances and wherein the subset is chosen such that each particular chunk of the subset belongs to different disks to prevent disk contention;

receiving an indication that one of the plurality of concurrently executing instances of the data scrubbing component has completed scrubbing of an assigned chunk;

responsive to receiving the indication that the one of the plurality of concurrently executing instances of the data scrubbing component has completed scrubbing of the assigned chunk, assigning another of the plurality of chunks not in the subset to the one of the plurality of concurrently executing instances of the data scrubbing component;

determining that all of the plurality of chunks of the production database have been scrubbed; and once all of the plurality of chunks have been scrubbed, executing one or more software test cases on the copy of the production database.

14. The non-transitory machine-readable medium of claim 13, wherein the operations of segmenting the copy of the production database into the plurality of chunks based upon row identifiers comprises segmenting the production database such that no two chunks are stored on a same disk.

15. The non-transitory machine-readable medium of claim 13, wherein the operation of segmenting the copy of the production database storing data into the plurality of chunks based upon row identifiers comprises assigning rows within a same datablock.

16. The non-transitory machine-readable medium of claim 13, wherein the operations further comprise:
logging each scrubbing operation performed on the plurality of chunks, including a chunk identifier, a scrubbing algorithm used, and a status of the scrubbing operation, to create an audit trail for compliance verification.

17. The non-transitory machine-readable medium of claim 13, wherein the operations further comprise:
logging a job identifier for each of the plurality of concurrently executing instances;
sending a request to one of the plurality of concurrently executing instances of the data scrubber component for a job status using a previously stored job identifier; and
wherein the receiving an indication that one of the plurality of concurrently executing instances of the data scrubbing component has completed scrubbing of its assigned chunk is responsive to sending the request.

* * * * *